United States Patent
Shtarov (10) Patent No.: US 10,294,393 B2
(45) Date of Patent: May 21, 2019

(54) POLYSILANE COMPOUND CONTAINING PERFLUORO(POLY)ETHER GROUP

(71) Applicant: THE CHEMOURS COMPANY FC, LLC, Wilmington, DE (US)

(72) Inventor: Alexander Borisovich Shtarov, Wilmnigton, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 16/081,824

(22) PCT Filed: Mar. 2, 2017

(86) PCT No.: PCT/US2017/020474
§ 371 (c)(1),
(2) Date: Aug. 31, 2018

(87) PCT Pub. No.: WO2017/155787
PCT Pub. Date: Sep. 14, 2017

(65) Prior Publication Data
US 2019/0062592 A1    Feb. 28, 2019

Related U.S. Application Data

(60) Provisional application No. 62/305,098, filed on Mar. 8, 2016.

(51) Int. Cl.
| C09D 183/08 | (2006.01) |
| C09D 171/02 | (2006.01) |
| C08G 65/336 | (2006.01) |
| C08G 77/24 | (2006.01) |

(52) U.S. Cl.
CPC ......... *C09D 183/08* (2013.01); *C08G 65/336* (2013.01); *C08G 77/24* (2013.01); *C09D 171/02* (2013.01)

(58) Field of Classification Search
CPC .................................................. C09D 183/08
USPC .......................................................... 549/215
See application file for complete search history.

(56) References Cited

U.S. PATENT DOCUMENTS 7,294,731 B1    11/2007  Flynn et al.
2008/0299399 A1  12/2008  Yamaguchi et al.

FOREIGN PATENT DOCUMENTS

| EP | 0 862 068 B1 | 6/2005 |
| WO | 2011/060047 A1 | 5/2011 |

OTHER PUBLICATIONS

PCT International Search Report and Written Opinion dated Jul. 3, 2017 (PCT/US2017/020474).
Ganzer, et al., Creating Long-Lived Superhydrophobic Polymer Surfaces Through Mechanically Assembled Monolayers, Science, Dec. 15, 2000, pp. 2130-2133, vol. 290.
Cassel et al., Original Synthesis of Linear, Branched and Cyclic Oligoglycerol Standards, Eur. J. Org. Chem, 2001, pp. 875-896, Wiley-VCH Verlag GmbH.
Howell et al., New derivatives of poly-hexafluoropropylene oxide from the corresponding alcohol, Journal of Fluorine Chemistry, 2005, pp. 281-288, vol. 126.

*Primary Examiner* — Taofiq A Solola (57) ABSTRACT

Composition containing at least one fluorinated silane of the formula (I):

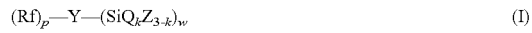

$$(Rf)_p\text{—}Y\text{—}(SiQ_kZ_{3-k})_w \qquad (I)$$

wherein: Rf represents monovalent $R^1f(OC_4F_8)_a$—$(OC_3F_6)_b$—$(OC_2F_4)_c$—$(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group, Q represents a hydrolyzable group, a hydroxyl group, or alkyloxy group and is capable of forming a siloxane bond with Si atoms located at the terminal of the molecular chain of formula (I) or other active sites of the treated surface, Z is a monovalent alkyl group, or hydrogen; p is 1 or 2, w is 2-14, p+w is 3 to 15, and k is from 1 to 3.

8 Claims, 1 Drawing Sheet

POLYSILANE COMPOUND CONTAINING PERFLUORO(POLY)ETHER GROUP

BACKGROUND

Field of the Invention

The present invention relates to coating compositions comprising a polysilane compound containing perfluoro (poly)ether group and methods of preparing the coating.

Description of Related Art

Many plastic or glass surfaces, such as surfaces of display or optical devices, are susceptible to contaminations like fingerprints, soil, cosmetics, etc. Various coating materials and technologies have been proposed to solve the problem and make such surfaces easy to clean. Moreover, the surface coatings need to be durable to resist scratch, wear and rubbing.

Generally, surfaces with high surface energy are more liable to be stained and harder to clean than those with low surface energy. Therefore, there is a need for coatings having low surface energy which can be securely attached to the desired surface, such as mobile devices, monitors, eyewear, windows and mirrors.

BRIEF SUMMARY OF THE INVENTION

The present invention provides a coating composition comprising: at least one fluorinated silane of the formula (I):

$$(Rf)_p\text{—}Y\text{—}(SiQ_kZ_{3-k})_w \quad (I)$$

wherein: Rf represents monovalent $R^1f(OC_4F_8)_a\text{—}(OC_3F_6)_b\text{—}(OC_2F_4)_c\text{—}(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group that enables branching and can contain polyvalent alkyl, divalent polysiloxane, p-, m-, or o-phenylene; Y contains at least 2 or more of the heteroatom containing groups selected from: —O—, —S—, —NR²—, —C(O)O—, C(O)NR²—, where R² is covalent bond, divalent alkylene, hydrogen, methyl, ethyl or isopropyl, The valency of Y is 3 or more represented by the sum of p+w from 3 to 15, and w is from 2 to 14, and k is from 1 to 3.

Polyvalent organic groups Y can be comprised of but not limited to the following examples:

—CH₂[—OCH₂CH(—OC₃H₆—)CH₂—]ₑ—OC₃H₆—, where e is from 1 to 4,

—CH₂CH₂SCH₂CH(—OC₃H₆—)CH₂OC₃H₆—,

—CH₂OCH₂CH(—OC₃H₆—)CH₂N(C₃H₆—)₂,

—CH₂[—OCH₂CH(—CH₂OC₃H₆—]ₘ—OC₃H₆—, where m is from 1 to 4, and combinations thereof.

The above polyvalent group Y can be further defined as follows:

—CH₂[—OCH₂CH(CH₂O-A-O—CH₂CH(—OC₃H₆—)CH₂OC₃H₆—)]_f—OC₃H₆—,

—CH₂[—OCH₂CH(CH₂O-A-O—CH₂CH(—OC₃H₆—)CH₂OC₃H₆—)]_f—O(CH₂CH₂O)_x—C₃H₆—,

—CH₂[—OCH₂CH(CH₂O-A-O—CH₂CH(—NHC₃H₆—)CH₂OC₃H₆—)]_f—OC₃H₆—,

—CH₂[—OCH₂CH(CH₂O-A-NH—CH₂CH(—OC₃H₆—)CH₂OC₃H₆—)]_f—OC₃H₆—,

—CH₂[—OCH₂CH(CH₂O-A-N(CH₂CH(—OC₃H₆—)CH₂OC₃H₆—)₂]_f—OC₃H₆—, where A is divalent linear or branched alkylene, or p-, m-, or o-phenylene group. Examples of group A are represented by but not limited to 1,4-butylene, 1,3-butylene, 1,2-butylene, 1,3-propylene, 1,2-propylene, 1,2-ethylene, and neopentylene —CH₂C(CH₃)₂CH₂— groups, and where f is from 1 to 4.

Q represents a hydrolyzable group, a hydroxyl group, or alkyloxy group, and is capable of forming a siloxane bond with other Si atoms located at the terminal of the molecular chain of formula (I) or other active sites of a treated surface. The group Q of Formula (I) is exemplified by the following: —Cl, —OCH₃, —OCH₂CH₃, —OCH(CH₃)₂, —O(CH₂CH₂O)_xCH₃, where x is from 1 to 10, —[—OSi(CH₃)₂—]_yOCH₃, —[—OSi(CH₃)₂-]_yOH, —[—OSi(CH₃)₂—]_yH, —[—OSi(CH₃)₂-]_yCH₃, —[—OSi(OCH₃)₂-]_yH, —[—OSiH(OCH₃)—]_yOCH₃ where y is from 1 to 6, —OSi(CH₃)₂O—Si(OCH₃)₂—C₃H₆—Si(OCH₃)₃, —OSi(CH₃)₂O—Si(OCH₃)₃.

Q represents a hydrolyzable group, acyloxy, Iminoxy, dialkylamino groups, a hydroxyl group, or alkoxy group. Detailed examples of these groups can include methoxy (—OCH₃), ethoxy (—OC₂H₅), isopropyloxy (—O-i-C₃H₇), dimethylketoximo (—ON=C(CH₃)₂), acetoxy (—OC(O)CH₃), dimethylamino (—N(CH₃)₂), diethylamino (—N(C₂H₅)₂), and diisopropylamino (—N(i-C₃H₇)₂), p is 1 or 2, and w is 2-14.

Z represents a monovalent alkyl group such as methyl, ethyl, propyl, butyl, phenyl group, or hydrogen.

The present invention also provides a coated article comprising: (a) a support surface; and (b) a coating comprising at least one fluorinated silane moiety of the formula (I) $(Rf)_p\text{—}Y\text{—}(SiQ_kZ_{3-k})_w$.

The present invention also provides a coated article comprising: (a) a support surface; and (b) a coating prepared by applying at least one fluorinated silane of the formula (I) $(Rf)_p\text{—}Y\text{—}(SiQ_kZ_{3-k})_w$ onto the support surface; wherein: Rf represents monovalent $R^1f(OC_4F_8)_a\text{—}(OC_3F_6)_b\text{—}(OC_2F_4)_c\text{—}(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group as defined above, Q and Z is as defined above.

BRIEF DESCRIPTION OF THE FIGURES

FIG. 1 shows schematic presentations of contact angles.

DETAILED DESCRIPTION

The foregoing general description and the following detailed description are exemplary and explanatory only and are not restrictive of the invention, as defined in the appended claims. Other features and benefits of any one or more of the embodiments will be apparent from the following detailed description, and from the claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Before addressing details of embodiments described below, some terms are defined or clarified.

The term "an elevated temperature", as used herein, means a temperature higher than the room temperature.

The term "unsaturated fluorocarbon", as used herein, means an unsaturated partially fluorinated organic molecule.

The term "hydrofluorocarbon", as used herein, means a molecule containing hydrogen, carbon, and fluorine. A hydrofluorocarbon in this disclosure can be saturated or unsaturated.

The term "hydrofluoroolefin", as used herein, means a molecule containing hydrogen, carbon, fluorine, and at least one carbon-carbon double bond.

The term "unsaturated fluorocarbon ether", as used herein, means a molecule containing carbon, fluorine, at least one carbon-carbon double bond, and at least one ether functional group.

The term "unsaturated hydrofluorocarbon ether", as used herein, means a molecule containing hydrogen, carbon, fluorine, at least one carbon-carbon double bond, and at least one ether functional group.

The term "saturated hydrofluorocarbon ether", as used herein, means a molecule containing hydrogen, carbon, fluorine, and at least one ether functional group.

The term "support surface", as used herein, means a solid surface onto which the coating composition of formula (I) and formula (IV) can be attached via covalent bonding. Typical support surfaces include metal oxides, metal, silica, glass, polymeric materials such as plastic, and any combinations thereof. In some embodiments of this invention, the support surface is selected from the group consisting of metal oxides, glass, plastics, and any combinations thereof. In some embodiments of this invention, the support surface is a metal oxide. In some embodiments of this invention, the support surface is a plastic. In some embodiments of this invention, the support surface is a glass. In some embodiments of this invention, the support surface is silica.

Figure 1A:
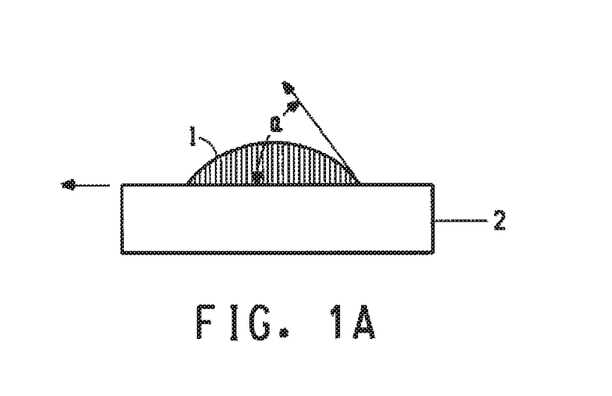
FIG. 1A presents a typical water contact angle on a hydrophilic surface.
Figure 1B:
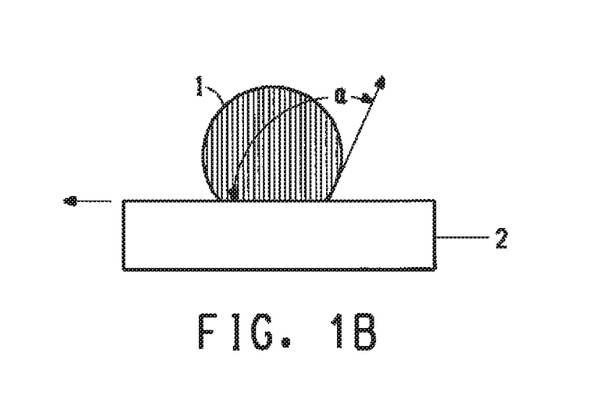
FIG. 1B presents a typical water contact angle on a hydrophobic surface.

The term "contact angle", as used herein, means the angle formed between the liquid/support surface interface and the liquid/air interface. It is illustrated as angle $\alpha$ in FIG. 1. A contact angle can be measured by providing a drop of liquid (1) on a surface of a substrate (2), looking at the profile of the liquid, and measuring the angle formed between the surface and the liquid profile with the vertex at the three-phase (solid surface, liquid and air) interface point as shown in FIG. 1.

Contact angle measurements can be used to determine the surface energy of a substrate. Generally, a larger contact angle indicates a smaller surface energy.

The present invention provides an antifouling, wear-resistant, anti-scratch, anti-smudge, anti-fingerprint, mold-release coating composition that can be applied to touch panel screens. The composition comprises at least one fluorinated silane of the formula (I) $(Rf)_p$—Y—$(SiQ_kZ_{3-k})_w$ wherein: Rf represents monovalent $R^1f(OC_4F_8)_a$—$(OC_3F_6)_b$—$(OC_2F_4)_c$—$(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group, with valency of 3 or more, preferred polyvalent organic group Y can contain polyvalent alkyl, and at least one of the following groups —O—, —S—, —$NR^2$—, examples of polyvalent organic group Y, include for example —$CH_2O$[—$CH_2CH$(—$OC_3H_6$—)$CH_2$—O-$]_e$-[$CH_2CH$(—$CH_2OC_3H_6$—)—O-$]_mC_3H_6$—, wherein e and m are independently integers from 0 to 4, and e+m is at least 1, —$CH_2CH_2SCH_2CH$(—$OC_3H_6$—)$CH_2OC_3H_6$—, —$CH_2OCH_2CH$(—$OC_3H_6$—)$CH_2N$(—$C_3H_6$—$)_2$, —$CH_2OCH_2CH$(—$OC_3H_6$—)—$CH_2OCH_2CH$(—$OC_3H_6$—) $CH_2OC_3H_6$—;

Q represents a hydrolyzable group, a hydroxyl group, or alkyloxy, group and is capable of forming a siloxane bond with Si atoms located at the terminal of the molecular chain of formula (I) or other active sites of a treated surface; Z represents a monovalent alkyl group such as methyl, ethyl, propyl, butyl, or a phenyl group, p is 1 or 2, and w is 2-14.

Shown below are additional examples of fluoropolyethers silanes according to formula (I):

-continued

Where h is from 1 to 4.

wherein e and m are independently integers from 0 to 4, and e+m is at least 1.

In an aspect of the invention, compounds of formula (I) can be prepared by hydrosylilation reaction from the allyloxy- or allylamino-compounds of formula (II):

where $Y^1$ is polyvalent group, and p and w are defined as in formula (I).

The skilled artisan will readily understand that compounds of formula (II) can be prepared from the corresponding hydroxyl derivatives of formula (III):

where v is 1-13 and p and w was defined in formula (I). Details of such synthesis are disclosed, for example, by Howell, et al. in the Journal of Fluorine Chemistry 126 (2005) 281-288.

The present invention also provides a coated article. The coated article comprises (a) a support surface; and (b) a coating comprising at least one fluorinated silane moiety of the formula (I) above, and wherein the at least one fluorinated silane moiety and the support surface are covalently bonded.

The present invention further provides a coated article which comprises (a) a support surface; and (b) a coating prepared by applying at least one fluorinated silane of the formula (I) $(Rf)_p$—Y—$(SiQ_kZ_{3-k})_w$ onto the support surface; wherein: Rf represents monovalent $R^1f(OC_4F_8)_a$—$(OC_3F_6)_b$—$(OC_2F_4)_c$—$(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group, with valency of 3 or more, Q represents a hydrolyzable group, a hydroxyl group, or alkyloxy group. Q is capable of forming a siloxane bond with Si atoms located at the terminal of the molecular chain of formula (1); p is 1 or 2, and w is 2-14; Z represents monovalent alkyl group such as methyl, ethyl, propyl, butyl, phenyl group, or hydrogen.

It was found through experiments that branched perfluoropolyether (PFPE) oligomers with the formula $C_3F_7O(CF(CF_3)CF_2O)_nCF(CF_3)$—, where n is an integer from 7 to 100 are particularly suitable to provide antifouling coatings which can be effectively resistant to contamination and easy to clean.

The fluorinated silane of the formula (I) $(Rf)_p$—Y—$(SiQ_kZ_{3-k})_w$ can be prepared by processes known in the art. For example, $C_3F_7O(CF(CF_3)CF_2O)_nCF(CF_3)CH_2OCH_2CH[OCH_2CH_2CH_2Si(OMe)_3]$—$CH_2OCH_2CH_2CH_2Si(OMe)_3$ or $C_3F_7O(CF(CF_3)CF_2O)_nCF(CF_3)CH_2OCH_2CH[OCH_2CH_2CH_2Si(OMe)_3]$—$CH_2O(CH_2)_4$—$OCH_2CH[OCH_2CH_2CH_2Si(OMe)_3]$—$CH_2OCH_2CH_2CH_2Si(OMe)_3$ can be made from the acyl fluoride $C_3F_7O(CF(CF_3)CF_2O)_nCF(CF_3)C(O)F$, where n is an integer from 7 to 100 using the following procedures: the acyl fluoride can be first transformed to become the corresponding methyl ester through reactions with methanol; the methyl ester can then be reduced by using $NaBH_4$ or $LiAlH_4$ to form the corresponding alcohol $C_3F_7O(CF(CF_3)CF_2O)_nCF(CF_3)CH_2OH$; the alcohol can then react with glycidol or glycidyl ethers (such as allyl glycidyl ether, diglycidyl ether, resorcinol diglycidyl ether, 1,4-butanediol diglycidyl ether, tris(2,3-epoxypropyl) isocyanurate, N,N-diglycidyl-4-glycidyloxyaniline, tris(4-hydroxyphenyl) methane triglycidyl ether, trimethylolpropane triglycidyl ether, 4,4-methylenebis(N,N-diglycidylaniline), 1,2-propanediol diglycidyl ether, poly(ethylene glycol) diglycidyl ether, poly(dimethylsiloxane) diglycidyl ether, and similar) using sodium hydride to form the mono-adducts as well as branched oligomers of glycerol and glycidyl ethers as described in European Journal of Organic Chemistry, (5), 875-896; 2001. Example of such chemical pathway is described as follows:

In the case when diglycidyl or triglycidyl compounds are used, one or two perfluoropolyether moieties can attach to the diglycidyl ether to form the oxirane-containing perfluoropolyethers of formula (IV):

where each p and j is from 1 to 2, and Rf is as defined above; where L comprises divalent or trivalent group containing at least 1 heteroatom such as —O—, —S—, and —N<. Group L can be represented by but not limited to —O(CH$_2$)$_4$O—, —O(CH$_2$)$_2$O—, —OC$_6$H$_4$O—, —OCH$_2$C(CH$_3$)$_2$CH$_2$O—, and j is from 1 to 2.

More specific examples of compound of formula (IV) include, for example,

Compounds of formula (IV) of the present invention containing perfluoropolyether and glycidyl groups are capable of forming covalent bond with hydroxyl and amino groups of the treated surface and can be applied from the diluted solution for the treatment of various surfaces to obtain wear-resistant, antifouling, anti-smudge, or mold-release coating, which can be effectively resistant to contamination and easy to clean. Obtained glycidyl derivatives of formula (IV) containing glycidyl groups can be further reacted with allyl alcohol, polyethylene glycol mono-allyl ether, diallyl amine and similar allyl-containing alcohols or amines. The resulting intermediates of formula (III) (Rf)$_p$—Y$^1$—(H)$_v$ (CH$_2$CH═CH$_2$)$_{w-v}$, such as C$_3$F$_7$O(CF(CF$_3$)CF$_2$O)$_n$CF (CF$_3$)CH$_2$OCH$_2$CH(OH)—CH$_2$O(CH$_2$)$_4$—OCH$_2$—CH (OH)—CH$_2$OCH$_2$CH═CH$_2$, containing one or more active hydroxyl groups can be further reacted with allyl bromide or allyl chloride in the presence of KOH to form the corresponding poly-allyl ether; the poly-allyl ether of formula (II), and can then be converted to the corresponding trichlorosilane through reactions with HSiCl$_3$ in the presence of the Ashby's catalyst; the formed trichlorosilane can then be converted to the final product of formula (I) such as C$_3$F$_7$O (CF(CF$_3$)CF$_2$O)$_n$CF(CF$_3$)CH$_2$OCH$_2$CH[OCH$_2$CH$_2$CH$_2$Si (OMe)$_3$]—CH$_2$OCH$_2$CH$_2$CH$_2$Si(OMe)$_3$, or C$_3$F$_7$O(CF (CF$_3$)CF$_2$O)$_n$CF(CF$_3$)CH$_2$OCH$_2$CH[OCH$_2$CH$_2$CH$_2$Si (OMe)$_3$]—CH$_2$O(CH$_2$)$_4$OCH$_2$CH[OCH$_2$CH$_2$CH$_2$ Si(OMe)$_3$]—CH$_2$OCH$_2$CH$_2$CH$_2$Si(OMe)$_3$ through methoxylation reactions with methanol. Details of the above synthesis are also disclosed by Howell, et al. in the Journal of Fluorine Chemistry 126 (2005) 281-288, and by Hervieu, et al. in the PCT Publication Number WO2011/060047.

For another example, amino containing intermediates of formula RfCH$_2$OCH$_2$CH(OH)CH$_2$O-A-O—CH$_2$CH(OH) CH$_2$NHCH$_2$CH$_2$CH$_2$Si(OMe)$_3$ can be formed through the reactions between glycidyl-containing compound of formula (IV), such as RfCH$_2$O—CH$_2$CH(OH)CH$_2$-L-CH$_2$-cyclo-CHCH$_2$O and NH$_2$CH$_2$CH$_2$CH$_2$Si(OMe)$_3$, as disclosed by Yokota, et al. in Eur. Pat. Appl. 862068, using NH$_2$CH$_2$CH$_2$CH$_2$Si(OMe)$_3$ that is commercially available from Gelest, Inc., Morrisville, Pa. The intermediates of formula RfCH$_2$OCH$_2$CH(OH)CH$_2$O-A-O—CH$_2$CH(OH)CH$_2$NHCH$_2$CH$_2$CH$_2$Si(OMe)$_3$ can be further reacted with allyl bromide or allyl chloride in the presence of KOH; and then can be converted to the corresponding trichlorosilane through the reaction with HSiCl$_3$ in the presence of the Ashby's catalyst; and reacted with methanol to make the poly-silane compound of formula (I), exemplified by RfCH$_2$OCH$_2$CH(OCH$_2$CH$_2$CH$_2$Si(OMe)$_3$)CH$_2$O-A-O—CH$_2$CH(OCH$_2$CH$_2$CH$_2$Si(OMe)$_3$)CH$_2$NHCH$_2$CH$_2$CH$_2$Si(OMe)$_3$.

The fluorinated composition of formula (I) or formula (IV) may be applied onto or contacted with a support surface by either wet coating methods or dry coating methods. Examples of dry coating methods include chemical vapor deposition (CVD) and physical vapor deposition (PVD). Examples of wet coating methods include dip coating, spray coating, spin coating, flow coating, roll coating, meniscus coating, and gravure coating, etc.

When wet coating methods are employed, a suitable support surface is a solid surface containing functional groups that can form covalent bonds with the fluorinated silane (Rf)$_p$—Y—(SiQ$_k$Z$_{3-k}$)$_w$. Such functional groups include —OH, —COOH, —CHO, —Br, —Cl, —NH$_2$, —NHR, etc., wherein R is a hydrocarbyl or a substituted hydrocarbyl. Preferably, the support surface has hydroxyl (—OH) groups on its surface. Examples of such support surfaces include metal oxides, glass, silica, and any combinations thereof. In some embodiments of this invention, the support surface is pre-treated to generate adequate functional groups, such as hydroxyl groups, on the surface. For example, a plastic surface may be treated with ozone to generate hydroxyl groups (Genzer, et al., Science 2000, 290, 2130). In some embodiments of this invention, the support surface is a pre-treated plastic having hydroxyl groups on its surface.

When fluorinated glycidyl containing composition of formula (IV) is employed, a suitable support surface is a solid surface containing functional groups that can form covalent bonds with the reactive epoxy groups. Such functional groups include —OH, —SH, —NH$_2$, —NHR, etc., wherein R is a hydrocarbyl or a substituted hydrocarbyl. Preferably, the support surface has hydroxyl (—OH) or amino (—NHR) groups on its surface. Examples of such support surfaces include glass and plastic. In some embodiments of this invention, the support surface is pre-treated to generate adequate functional groups, such as hydroxyl groups, on the surface by treatment with ozone.

Typically, before contacting with the coating composition, the support surface needs to be cleaned and/or pre-treated using techniques known in the art. For example, a support surface can be washed with a base such as NaOH or KOH aqueous solution, rinsed with deionized water, washed again with acid such as HCl or HNO$_3$, and then rinsed again with deionized water followed with anhydrous methanol or ethanol and allowed to dry at elevated temperatures. Specific examples of support surface preparation are described in the Example section.

Generally, a solvent is required to dissolve the fluorinated compound of formula (I) or formula (IV) to make a coating solution for wet coating methods and some dry coating methods. Therefore, the coating composition comprises at least one solvent. The solvent can be fluorinated or non-fluorinated. Suitable fluorinated solvents include hydrofluorocarbon, saturated hydrofluorocarbon ether, unsaturated fluorocarbon ether, and mixtures thereof. Examples of hydrofluorocarbon include saturated hydrofluorocarbon and hydrofluoroolefin. Examples of saturated hydrofluorocarbon ether include alkyl perfluoroalkyl ether. Examples of unsaturated fluorocarbon ether include unsaturated hydrofluorocarbon ether. Examples of unsaturated hydrofluorocarbon ether include alkyl perfluoroalkene ether. In some embodiments of this invention, the at least one solvent is selected from the group consisting of saturated hydrofluorocarbon, hydrofluoroolefin, alkyl perfluoroalkyl ether, alkyl perfluoroalkene ether, and combinations thereof.

In some embodiments of this invention, the at least one solvent comprises, consists essentially of, or consists of a saturated hydrofluorocarbon. Preferred saturated hydrofluorocarbons have normal boiling points of from about 50° C. to about 150° C. More preferred saturated hydrofluorocarbons have normal boiling points of from about 60° C. to about 120° C. In some embodiments of this invention, the at least one solvent comprises, consists essentially of, or consists of CF$_3$CHFCHFCF$_2$CF$_3$, i.e. Vertrel™ XF specialty fluid (CAS #138495-42-8, Chemours Company, Wilmington, Del.); or CH$_3$OC$_4$F$_9$, i.e. 3M™ Novec™ Engineered Fluid HFE-7100 (3M, Minneapolis, Minn.).

Many of saturated fluorinated hydrocarbons have been found to contribute to global warming. Generally, unsaturated fluorocarbons have lower global warming potentials (GWPs) than their saturated counterparts. In some embodiments of this invention, the at least one solvent comprises, consists essentially of, or consists of an unsaturated fluorocarbon. Preferably, the at least one solvent comprises, consists essentially of, or consists of an unsaturated fluorocarbon having normal boiling point of from about 50° C. to about 150° C. More preferably, the at least one solvent comprises, consists essentially of, or consists of an unsaturated fluorocarbon having normal boiling point of from about 60° C. to about 120° C.

Examples of the unsaturated fluorocarbon include hydrofluoroolefins, alkyl perfluoroalkene ethers, and mixtures thereof. In some embodiments of this invention, the at least one solvent comprises, consists essentially of, or consists of a hydrofluoroolefin. Preferred hydrofluoroolefins have normal boiling points of from about 50° C. to about 150° C. More preferred hydrofluoroolefins have normal boiling points of from about 60° C. to about 120° C.

In some embodiments of this invention, the at least one solvent comprises, consists essentially of, or consists of an alkyl perfluoroalkene ether. Preferred alkyl perfluoroalkene ethers have normal boiling points of from about 50° C. to about 150° C. More preferred alkyl perfluoroalkene ethers have normal boiling points of from about 60° C. to about 120° C. In some embodiments of this invention, the alkyl perfluoroalkene ether is methyl perfluoroalkene ether, ethyl perfluoroalkene ether, or mixtures thereof. In some embodiments of this invention, the methyl perfluoroalkene ether is methyl perfluoroheptene ether, methyl perfluoropentene ether, or mixtures thereof. Typically, methyl perfluoroheptene ether or methyl perfluoropentene ether is a mixture of its isomers respectively. For examples, methyl perfluoroheptene ether may be a mixture comprising CF$_3$CF$_2$CF═CFCF(OCH$_3$)CF$_2$CF$_3$, CF$_3$CF$_2$C(OCH$_3$)═CFCF$_2$CF$_2$CF$_3$, and CF$_3$CF═CFCF(OCH$_3$)CF$_2$CF$_2$CF$_3$. Methyl perfluoroheptene ether may also be a mixture comprising CF$_3$CF$_2$CF═CFCF(OCH$_3$)CF$_2$CF$_3$, CF$_3$CF$_2$C(OCH$_3$)═CFCF$_2$CF$_2$CF$_3$, CF$_3$CF$_2$CF═C(OCH$_3$)CF$_2$CF$_2$CF$_3$, CF$_3$CF═CFCF(OCH$_3$)CF$_2$CF$_2$CF$_3$, and CF$_3$CF$_2$CF(OCH$_3$)CFHCF$_2$CF$_2$CF$_3$. Methyl perfluoropentene ether may be a mixture comprising CF$_3$CF═C(OCH$_3$)CF$_2$CF$_3$, CF$_3$C(OCH$_3$)═CFCF$_2$CF$_3$, and CF$_3$CF═CFCF(OCH$_3$)CF$_3$.

Suitable non-fluorinated solvents include alcohols, ketones, nitriles, cyclic ethers, noncyclic ethers, and mixtures thereof. Preferably the non-fluorinated solvent is selected from the group consisting of alcohols, ketones, nitriles, cyclic ethers, noncyclic ethers, and mixtures thereof, wherein said non-fluorinated solvent has normal boiling point of from about 50° C. to about 150° C. More preferably, the non-fluorinated solvent is selected from the group consisting of alcohols, ketones, nitriles, cyclic ethers, noncyclic ethers, and mixtures thereof, wherein said non-fluorinated solvent has normal boiling point of from about 60° C. to about 120° C. In some embodiments of this invention, the non-fluorinated solvent is selected from the group consisting of methanol, ethanol, proponal, isoproponal, acetone, methyl ethyl ketone, acetonitrile, tetrahydrofuran, and mixtures thereof. In some embodiments of this invention, the non-fluorinated solvent is selected from the group consisting of methanol, ethanol, proponal, isoproponal, and mixtures thereof.

Optionally, the coating composition containing formula (I) or formula (IV) also comprise at least one catalyst. The suitable catalysts facilitate the covalent bond formation between the fluorinated silane and fluorinated epoxide and the support surface. In some embodiments of this invention, the at least one catalyst comprises, consists essentially of, or consists of acids, bases, or water. Examples of acids include inorganic acids, alkyl sulfonic acids, halogenated alkyl sulfonic acids, carboxylic acids, halogenated carboxylic acids, and mixtures thereof. Examples of inorganic acids include HCl, $H_2SO_4$, $HNO_3$, and mixtures thereof. Examples of carboxylic acids include formic acid, acetic acid, and mixtures thereof. Examples of bases include inorganic bases, substituted and unsubstituted trialkylamines, pyridine and its derivatives, and mixtures thereof. Examples of inorganic bases include NaOH, KOH, and mixtures thereof.

When a wet coating method is employed, the coating composition can be applied to or contacted with the support surface using known techniques to form a coating layer on the support surface. The support surface typically is cleaned and/or pre-treated as described above before contacting with the coating composition. The coated support surface is then dried or cured at an elevated temperature. During the drying or curing process, the solvents evaporate and the fluorinated silane $(Rf)_p—Y—(SiQ_kZ_{3-k})_w$ reacts with the support surface to form at least one covalent bond with the support surface. For example, the fluorinated silane may form at least one Si—O-M bond with a metal oxide support surface, wherein M represents a metal. For another example, the fluorinated silane may form at least one Si—O—Si bond with a silica support surface. For another example, the fluorinated silane may form at least one Si—O-M bond and/or at least one Si—O—Si bond with a glass support surface, wherein M represents a metal. In some embodiments of this invention, a fluorinated silane may form Si—O—Si cross-link bond with an adjacent fluorinated silane. The coating may also comprise some unreacted or uncondensed Si—OH or Si-Q groups.

Typically, the coated support surface is dried or cured at the temperature range of from about 18° C. to about 200° C. In some embodiments of this invention, the coated support surface is dried or cured at the temperature range of from about 18° C. to about 100° C.

In some embodiments of this invention, a coated article comprises, consists essentially of, or consists of (a) a support surface; and (b) a coating prepared by applying at least one fluorinated silane of the formula (I) $(Rf)_p—Y—(SiQ_kZ_{3-k})_w$ onto the support surface; wherein: Rf represents monovalent $R^1f(OC_4F_8)_a—(OC_3F_6)_b—(OC_2F_4)_c—(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group as defined above, Q represents a hydrolyzable group, a hydroxyl group, or alkyloxy group capable of forming a siloxane bond with Si atoms located at the terminal of the molecular chain of formula (I) or other active sites of a treated surface; p is 1 or 2, and w is 2-14. In some embodiments of this invention, the at least one fluorinated silane is dissolved in at least one solvent before being applied onto the support surface.

In an aspect of the invention, the fluorinated silane of the formula (I) $(Rf)_p—Y—(SiQ_kZ_{3-k})_w$ is represented by the formula wherein e and m are an integer from 0 to 4, and e+m is at least 1, and wherein the at least one fluorinated silane moiety and the support surface are covalently bonded.

Many aspects and embodiments have been described above and are merely exemplary and not limiting. After reading this specification, skilled artisans appreciate that other aspects and embodiments are possible without departing from the scope of the invention.

EXAMPLES

The concepts described herein will be further described in the following examples, which do not limit the scope of the invention described in the claims.

Measurement of Contact Angles Examples 1-6

All static contact angles were measured on a Ramé-Hart Model 590 F4 Series Advanced Automated Goniometer with tilting base. The equipped sample pump was used to dispense a 10 µL liquid drop onto the prepared surface of a substrate (support surface). The liquid drop was then allowed to equilibrate for 10 seconds and a static contact angle measurement was taken using the DROPimage software included with the instrument. This method was repeated a maximum of seven times down the length of the glass slide. The average and the standard deviation, with Bessel correction, for the measurements from each slide were then calculated using the Microsoft Excel 2013 software.

The slides were then abraded with 0000 steel wool for 500 cycles and water contact angle measured again. The abrasion test continued and water contact angle was measured again after every 500 abrasion cycles until the water contact angle dropped below 100°.

The term "roll-off angle", as used herein, describes the angle at which translation of the drop across the surface begins. The roll-off angle is measured on a Ramé-Hart Model 590 F4 Series Advanced Automated Goniometer. Using the tilting plate method. The measurement was made using a 10 μL liquid drop and tilting the base to 90°.

Slide Preparation Examples 1-6

The slides, VWR Micro Slides Superfrost® White and Generation 3 Gorilla Glass, were placed in a glass vertical staining jar. A 2.5 M aqueous sodium hydroxide solution was poured into the jar so that the slides were immersed up to the labeling section for 2.5 hours and then rinsed with distilled water. The slides were then placed into a vertical staining jar containing distilled water and were sonicated in an ultrasonic bath for 10 minutes followed by immersion in 0.1 M aqueous solution of hydrochloric acid for 10 minutes and finally distilled water again for 10 minutes. The slides were then soaked in anhydrous methanol for 5 minutes. The slides were then dipped in a 0.2 wt % of fluorinated silane solution in HFE-7100 fluorocarbon solvent for 5 minutes. The slides were then removed from the solution and placed in a slide holder to dry at 110° C. for 35 minutes. The slides were then buffed with a Kimwipe™ to remove any residual material.

Preparation of Fluorinated Silanes

The following examples demonstrate the preparation of fluorinated silane solutions according to the present invention.

Example 1

Perfluoro(poly)ether diallyl compound $F(C_3F_6O)_n$—$CF(CF_3)CH_2O$—$CH_2CH(OCH_2CH=CH_2)$—$CH_2OCH_2CH=CH_2$ (2.2 g, 0.54 mmol, MW=4050, prepared according to the method described in the Journal of Fluorine Chemistry, 126 (2005) 281-288, from the corresponding hydroxy derivative), tetrahydrofuran (3.3 g), HFE-7100 solvent (5.5 g), platinum catalyst solution (0.026 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.0006 g), were placed in dried 100 mL 3-neck round bottom flask equipped with a cold water condenser, magnetic stirrer, heating mantle, and thermocouple. $HSiCl_3$ (0.5 g, 3.8 mol) was added and the reaction mixture was heated to 56° C. during 20 hours. Conversion of 98% was achieved by the $^1H$ NMR analysis. The mixture was cooled to room temperature treated 3 times with excess of methanol, phase separated and dried in vacuum to afford 2 g of $F(C_3F_6O)_n$—$CF(CF_3)CH_2O$—$CH_2CH(OCH_2CH_2CH_2Si(OCH_3)_3)$—$CH_2OCH_2CH_2CH_2Si(OCH_3)_3$ as white oil.

Example 2

Perfluoro(poly)ether poly-allyl compound $F(C_3F_6O)_n$—$CF(CF_3)CH_2OCH_2CH(OCH_2CH=CH_2)$—$CH_2N[CH_2CH(OCH_2CH=CH_2)$—$CH_2OCH_2CH=CH_2]$-p-$C_6H_3$—$OCH_2CH(OCH_2CH=CH_2)$—$CH_2OCH_2CH=CH_2$ (1.56 g, 0.28 mmol, MW=5600), tetrahydrofuran (3 g), HFE-7100 (4 g), platinum catalyst solution (0.014 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.0004 g), were placed in 100 mL 3-neck round bottom flask equipped with a cold water condenser, magnetic stirrer, nitrogen blanket, heating mantle, and thermocouple. $HSiCl_3$ (1.02 g, 7.5 mol) was added and the reaction mixture was heated to 53° C. during 16 hours. Additional $C_{12}H_{24}O_4PtSi_4$ catalyst (0.05 g of 0.1M solution), triphenyl phosphine (0.0005 g), $HSiCl_3$ (0.8 g) was then added and the reaction mixture was heated at 50° C. during 24 hours. Complete conversion was achieved by the $^1H$ NMR analysis. The mixture was cooled to room temperature treated with methanol (4.5 g), phase separated and dried in vacuum to afford 1.02 g of $F(C_3F_6O)_n$—$CF(CF_3)CH_2O$—$CH_2CH(OCH_2CH_2CH_2Si(OCH_3)_3)$—$CH_2N[CH_2CH(OCH_2CH_2CH_2$—$Si(OCH_3)_3)$—$CH_2OCH_2CH_2CH_2Si(OCH_3)_3]$-p-$C_6H_3$—$OCH_2CH(OCH_2CH_2CH_2$—$Si(OCH_3)_3)$—$CH_2OCH_2CH_2CH_2Si(OCH_3)_3$ as a yellow viscous oil.

Example 3

Perfluoro(poly)ether poly-allyl compound with main formula $F(C_3F_6O)_n$—$CF(CF_3)CH_2OCH_2CH(OCH_2CH=CH_2)$—$CH_2O(CH_2)_4$—$OCH_2CH(OCH_2CH=CH_2)$—$CH_2OCH_2CH=CH_2$ (3.19 g, 0.59 mmol, MW=5400, prepared according to the method described in the Journal of Fluorine Chemistry, 126 (2005) 281-288, from the corresponding hydroxy derivative), tetrahydrofuran (4 g), HFE-7100 solvent (5.7 g), platinum catalyst solution (0.026 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.0007 g), were placed in 100 mL 3-neck round bottom flask equipped with a cold water condenser, magnetic stirrer, nitrogen blanket, heating mantle, and thermocouple. $HSiCl_3$ (0.6 g, 3.5 mol) was added and the reaction mixture was heated to 55° C. during 20 hours. Complete conversion was achieved by the $^1H$ NMR analysis. The mixture was cooled to room temperature treated 2 times with excess of methanol, phase separated and dried in vacuum to afford 2.5 g of $F(C_3F_6O)_n$—$CF(CF_3)CH_2OCH_2CH(OCH_2CH_2CH_2Si(OCH_3)_3)$—$CH_2O$—$(CH_2)_4$—$OCH_2CH(OCH_2CH_2CH_2Si(OCH_3)_3)$—$CH_2OCH_2CH_2CH_2Si(OCH_3)_3$ as clear oil.

Example 4

Perfluoro(poly)ether poly-allyl compound $F(C_3F_6O)_n$—$CF(CF_3)CH_2OCH_2CH(OCH_2CH=CH_2)$—$CH_2OCH_2CH=CH_2$ (4.0 g, 0.96 mmol, MW=5400, prepared according to the method described in the Journal of Fluorine Chemistry, 126 (2005) 281-288, from corresponding hydroxy derivative), tetrahydrofuran (5 g), HFE-7100 solvent (7 g), platinum catalyst solution (0.2 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.005 g), were placed in 100 mL 3-neck round bottom flask equipped with a cold water condenser, magnetic stirrer, nitrogen blanket, heating mantle, and thermocouple. $HSiCl_3$ (2.2 g, 16.7 mol) was added and the reaction mixture was heated to 58° C. during 20 hours. Complete conversion was achieved by the NMR analysis. The mixture was cooled to room temperature treated 3 times with excess of methanol, phase separated and dried in vacuum to afford 7.2 g of $F(C_3F_6O)_n$—$CF(CF_3)$ $CH_2OCH_2CH(OCH_2CH_2CH_2Si(OCH_3)_3)$—$CH_2OCH_2CH_2CH_2Si(OCH_3)_3$ as clear oil.

Example 5

Perfluoro(poly)ether poly-allyl compound with main formula $F(C_3F_6O)_n$—$CF(CF_3)CH_2OCH_2CH$ $(OCH_2CH=CH_2)$—$CH_2O$—$CH_2C(CH_3)_2CH_2$—$OCH_2CH$ $(OCH_2CH=CH_2)$—$CH_2OCH_2CH=CH_2$ (2.64 g, 0.62 mmol, MW=4260), tetrahydrofuran (3.2 g), HFE-7100 solvent (4.7 g), platinum catalyst solution (0.029 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.0006 g), were placed in 100 mL 3-neck round bottom flask equipped with a cold water condenser, magnetic stirrer, nitrogen blanket, heating mantle, and thermocouple. $HSiCl_3$ (0.6 g, 3.5 mol) was added and the reaction mixture was heated to 55° C. during 20 hours. More than 98% conversion was achieved by the $^1H$ NMR analysis. The mixture was cooled to room temperature treated 2 times with excess of methanol, phase separated and dried in vacuum to afford 1.25 g of $F(C_3F_6O)_n$—$CF(CF_3)CH_2OCH_2CH(OCH_2CH_2CH_2$—$Si$ $(OCH_3)_3)$—$CH_2O$—$CH_2C(CH_3)_2CH_2$—$OCH_2CH$ $(OCH_2CH_2CH_2Si(OCH_3)_3)$—$CH_2OCH_2CH_2CH_2Si$ $(OCH_3)_3$ as white oil.

Example 6

Perfluoro(poly)ether poly-allyl compound with main formula $F(C_3F_6O)_n$—$CF(CF_3)CH_2OCH_2CH$ $(OCH_2CH=CH_2)$—$CH_2O$—$(CH_2)_4$—$OCH_2CH$ $(OCH_2CH=CH_2)$—$CH_2OCH_2CH=CH_2$ (3.19 g, 0.59 mmol, MW=5440), tetrahydrofuran (3.8 g), HFE-7100 solvent (5.7 g), platinum catalyst solution (0.026 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.0007 g), were placed in 100 mL 3-neck round bottom flask equipped with a cold water condenser, magnetic stirrer, nitrogen blanket, heating mantle, and thermocouple. $HSiCl_3$ (0.6 g, 3.5 mol) was added and the reaction mixture was heated to 55° C. during 20 hours. More than 95% conversion was achieved by the $^1H$ NMR analysis. The mixture was cooled to room temperature, treated 2 times with excess of methanol, phase separated and dried in vacuum to afford 2.5 g of $F(C_3F_6O)_n$—$CF(CF_3)CH_2OCH_2CH(OCH_2CH_2CH_2Si$ $(OCH_3)_3)$—$CH_2O$—$(CH_2)_4$—$OCH_2CH(OCH_2CH_2CH_2Si$ $(OCH_3)_3)$—$CH_2OCH_2CH_2CH_2$—$Si(OCH_3)_3$ as clear oil.

Synthesis Example 7

Dry Perfluoro(poly)ether alcohol compound $F(C_3F_6O)_n$—$CF(CF_3)CH_2OH$ (22 g, 12.2 mmol, MW=1800), sodium methoxide (0.3 g), partially Fluorinated Alcohol Substituted Glycol Capstone™ FS-3100 (0.23 g, available from Chemours), were placed in 100 mL 3-neck round bottom flask equipped with a cold water condenser, magnetic stirrer, heating mantle, and thermocouple under nitrogen and heated in vacuum at 40-45° C. for 15 minutes. After methanol was removed, tetrabutyl ammonium iodide (0.06 g) and 1,4-butanediol diglycidyl ether was added (2.84 g, purchased from Aldrich) to the flask at 70° C., and then heated to 100° C. for 6 hours. After addition of sodium hydride (0.1 g), and additional heating to 100° C. for 10 hours 95% conversion was achieved. The unreacted diglycidyl ether was extracted with tetrahydrofuran and product was dried in vacuum to afford $F(C_3F_6O)_n$—$CF(CF_3)$ $CH_2O$—$CH_2CH(OH)$—$CH_2O$—$(CH_2)_4$—$OCH_2$-cyclo-$CHCH_2O$ (18.3 g) as yellow oil.

Comparative Synthesis Example 1

Perfluoro(poly)ether poly-allyl compound with main formula $F(C_3F_6O)_n$—$CF(CF_3)CH_2OCH_2CH=CH_2$ (7.0 g, 1.36 mmol, Mn=5140, prepared according to the method described in the Journal of Fluorine Chemistry, 126 (2005) 281-288, from the corresponding hydroxyl derivative $F(C_3F_6O)_n$—$CF(CF_3)CH_2OH$), tetrahydrofuran (7 g), HFE-7100 solvent (9 g), platinum catalyst solution (0.064 g of 0.104 M platinum-2,4,6,8-tetramethyl-2,4,5,8-tetravinylcyclotetrasiloxane complex in methylvinylcyclosiloxanes, purchased from Aldrich), triphenyl phosphine (0.0015 g), were placed in 100 mL 3-neck round bottom flask equipped with a cold water condenser, magnetic stirrer, nitrogen blanket, heating mantle, and thermocouple. $HSiCl_3$ (0.74 g, 5.5 mol) was added and the reaction mixture was heated to 55° C. during 20 hours. More than 98% conversion was achieved by the $^1H$ NMR analysis. The mixture was cooled to room temperature treated 2 times with excess of methanol, phase separated and dried in vacuum to afford $F(C_3F_6O)_n$—$CF$ $(CF_3)CH_2O$—$CH_2CH_2CH_2Si(OCH_3)_3$ (6 g) as clear oil.

Tables 1-4 demonstrate the effectiveness of using fluorinated silane solutions in fluorinated solvent prepared according to the present invention on the surface of two types of glass, Super Frost White (Tables 1 and 2) and Gorilla Glass (Tables 3 and 4).

Water contact angle (WCA) measurements on Super Frost White glass slides were measured as described above and are shown in Tables 1 and 2.

TABLE 1

| Example No. | Roll-off angle (°) | Initial WCA (°) | Abraded WCA (°) (500 cycles) | Abraded WCA (°) (1000 cycles) | Abraded WCA (°) (1500 cycles) | Abraded WCA (°) (2000 cycles) | Abraded WCA (°) (2500 cycles) |
|---|---|---|---|---|---|---|---|
| Comparative Example 1 | 4.6 | 116.2 | 112.1 | 102.8 | 100.2 | 93.9 | — |
| Example 1 | — | 117.5 | 112.7 | 109.9 | 106.6 | 106.3 | 96.0 |
| Example 2 | 8.8 | 117.8 | 109.3 | 107.6 | 105.4 | 99.5 | — |
| Example 3 | 7.2 | 115.1 | 110.2 | 99.5 | — | — | — |

TABLE 1-continued

| Example No. | Roll-off angle (°) | Initial WCA (°) | Abraded WCA (°) (500 cycles) | Abraded WCA (°) (1000 cycles) | Abraded WCA (°) (1500 cycles) | Abraded WCA (°) (2000 cycles) | Abraded WCA (°) (2500 cycles) |
|---|---|---|---|---|---|---|---|
| Example 4 | 14.6 | 112.1 | 112.0 | 108.7 | 113.3 | 110.9 | 105.4 |
| Example 5 | 5.8 | 115.1 | 105.4 | 95.0 | — | — | — |
| Example 6 | 6.4 | 114.1 | 109.9 | 106.4 | 94.0 | — | — |

"—" - no measurement was performed.

After drying or curing process described above the glass slides were wiped with Ethanol-wipe and water contact angle (WCA) measurements were done as described above and are shown in Table 2

TABLE 2

| Example No. | Roll-off angle (°) | Initial WCA (°) | Abraded WCA (°) (500 cycles) | Abraded WCA (°) (1000 cycles) | Abraded WCA (°) (1500 cycles) | Abraded WCA (°) (2000 cycles) | Abraded WCA (°) (2500 cycles) |
|---|---|---|---|---|---|---|---|
| Comparative Example 1 | 11.2 | 115.2 | 110.5 | 102.7 | 99.1 | — | — |
| Example 1 | 8.8 | 117.1 | 111.5 | 103.8 | 96.6 | — | — |
| Example 2 | 6.0 | 114.1 | 107.1 | 105.2 | 94.9 | — | — |
| Example 3 | 9.0 | 111.3 | 106.7 | 84.5 | — | — | — |
| Example 4 | 7.6 | 112.4 | 107.9 | 106.6 | 108.7 | 106.1 | 103.2 |
| Example 5 | 7.0 | 113.8 | 93.3 | — | — | — | — |
| Example 6 | 5.4 | 115.5 | 110.3 | 108.9 | 87.6 | — | — |

Water contact angle (WCA) measurements on Gorilla Glass were measured as described above and are shown in Tables 3 and 4.

TABLE 3

| Example No. | Roll-off angle (°) | Initial WCA (°) | Abraded WCA (°) (500 cycles) | Abraded WCA (°) (1000 cycles) | Abraded WCA (°) (1500 cycles) | Abraded WCA (°) (2000 cycles) |
|---|---|---|---|---|---|---|
| Comparative Example 1 | 8.8 | 115.0 | 107.3 | 85.2 | — | — |
| Example 1 | 7.0 | 115.9 | 113.2 | 99.3 | — | — |
| Example 2 | 8.0 | 113.7 | 89.5 | — | — | — |
| Example 3 | 7.8 | 112.5 | 86.4 | — | — | — |
| Example 4 | 11.4 | 113.5 | 112.2 | 111.1 | 109.5 | 95.7 |
| Example 5 | 8.0 | 113.5 | 106.0 | 89.1 | — | — |
| Example 6 | 5.6 | 115.2 | 112.0 | 96.4 | — | — |

After drying or curing process described above the Gorilla Glass slides were wiped with Ethanol-wipe and water contact angle (WCA) measurements were done as described above and are shown in Table 4.

TABLE 4

| Example No. | Roll-off angle (°) | Initial WCA (°) | Abraded WCA (°) (500 cycles) | Abraded WCA (°) (1000 cycles) | Abraded WCA (°) (1500 cycles) | Abraded WCA (°) (2000 cycles) | Abraded WCA (°) (2500 cycles) |
|---|---|---|---|---|---|---|---|
| Comparative Example 1 | 5.4 | 117.3 | 114.3 | 85.0 | — | — | — |
| Example 1 | 6.4 | 117.1 | 99.3 | — | — | — | — |
| Example 2 | 7.6 | 114.8 | 91.2 | — | — | — | — |
| Example 3 | 5.4 | 114.7 | 78.1 | — | — | — | — |
| Example 4 | 5.8 | 115.5 | 109.7 | 107.1 | 106.8 | 100.7 | 102.1 |
| Example 5 | 6.4 | 116.2 | 93.1 | — | — | — | — |
| Example 6 | 5.2 | 116.4 | 82.1 | — | — | — | — |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

What is claimed is:

1. A coating composition comprising: at least one fluorinated silane of the formula (I):

$$(Rf)_p\text{---}Y\text{---}(SiQ_kZ_{3-k})_w \qquad (I)$$

wherein: Rf represents monovalent $R^1f(OC_4F_8)_a$—$(OC_3F_6)_b$—$(OC_2F_4)_c$—$(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; Y represents a polyvalent organic group that enables branching and can contain polyvalent alkyl, divalent polysiloxane, p-, m-, or o-phenylene; Y contains at least 2 or more of the heteroatom containing groups selected from: —O—, —S—, —$NR^2$—, —C(O)O—, C(O)$NR^2$—, where $R^2$ is covalent bond, divalent alkylene, hydrogen, methyl, ethyl or isopropyl; Q represents a hydrolyzable group, a hydroxyl group, or alkyloxy group, Z represents a monovalent alkyl group such as methyl, ethyl, propyl, butyl, phenyl group, or hydrogen, p is 1 or 2, w is 2-14, p+w is 3 to 15, and k is from 1 to 3.

2. The composition of claim 1 wherein the fluorinated silane has the formula $F(C_3F_6O)_n$—$CF(CF_3)CH_2$—O—[—$CH_2CH($—$OC_3H_6Si(OCH_3)_3)CH_2$—O—$]_e$—[$CH_2CH($—$CH_2OC_3H_6Si(OCH_3)_3)O$—$]_m$—$C_3H_6$—$Si(OCH_3)_3$, wherein e and m are independently integers from 0 to 4, and e+m is at least 1, and n is an integer from 7 to 100.

3. The composition of claim 1 wherein the fluorinated silane has the formula $F(C_3F_6O)_n$—$CF(CF_3)CH_2O$—$CH_2CH$—$(OCH_2CH_2CH_2Si(OCH_3)_3)$—$CH_2OCH_2CH_2CH_2Si(OCH_3)_3$, and n is an integer from 7 to 100.

4. The coating composition of claim 1 wherein the Rf— is $C_3F_7O(CF(CF_3)CF_2O)_nCF(CF_3)$—, n is an integer from 7 to 100, and Y is —$CH_2OCH_2CH(OCH_2CH_2CH_2$—)$CH_2O$-p-$C_6H_4$—$N[CH_2CH(OCH_2CH_2CH_2$—) $CH_2OCH_2CH_2CH_2$—$]_2$.

5. A coating composition comprising: at least one fluorinated oxirane of the formula (IV):

(IV)

wherein: Rf represents monovalent $R^1f(OC_4F_8)_a$—$(OC_3F_6)_b$—$(OC_2F_4)_c$—$(OCF_2)_d$ wherein a, b, c, and d independently represent an integer of from 3 to 200 inclusive, and the sum of a, b, c, and d is at least 1; $R^1f$ is fluorinated alkyl group, linear or branched, with 1-4 carbons; L is a divalent or trivalent group containing at least 1 of the following heteroatoms —O—, —S—, and —N<, j is from 1 to 2, and p is from 1 to 2.

6. The coating composition of claim 5 wherein the Rf— is $C_3F_7O(CF(CF_3)CF_2O)_nCF(CF_3)$—, and n is an integer from 7 to 100.

7. The coating composition of claim 6 wherein the L is —$OCH_2CH_2CH_2CH_2O$—.

8. The coating composition of claim 6 wherein the L is

* * * * *